US010037311B2

(12) United States Patent
Idicula et al.

(10) Patent No.: US 10,037,311 B2
(45) Date of Patent: Jul. 31, 2018

(54) TECHNIQUE FOR SKIPPING IRRELEVANT PORTIONS OF DOCUMENTS DURING STREAMING XPATH EVALUATION

(71) Applicant: Oracle International Corporation, Redwood Shores, CA (US)

(72) Inventors: Sam Idicula, Santa Clara, CA (US); Nipun Agarwal, Santa Clara, CA (US); Sanket Malde, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1000 days.

(21) Appl. No.: 14/231,491

(22) Filed: Mar. 31, 2014

(65) Prior Publication Data

US 2014/0215311 A1    Jul. 31, 2014

Related U.S. Application Data

(63) Continuation of application No. 12/491,981, filed on Jun. 25, 2009, now Pat. No. 8,713,426.

(51) Int. Cl.
*G06F 17/00* (2006.01)
*G06F 17/22* (2006.01)
*G06F 17/30* (2006.01)

(52) U.S. Cl.
CPC .... *G06F 17/2247* (2013.01); *G06F 17/30929* (2013.01); *G06F 17/22* (2013.01)

(58) Field of Classification Search
CPC . G06F 17/22; G06F 17/2247; G06F 17/30929
See application file for complete search history.

(56) References Cited

U.S. PATENT DOCUMENTS 5,257,365 A * 10/1993 Powers ............ G06F 17/30327
5,870,559 A *  2/1999 Leshem ................. G06F 11/32
                                                707/E17.116

(Continued)

FOREIGN PATENT DOCUMENTS

WO    WO 2008/118537 A1    10/2008

OTHER PUBLICATIONS

U.S. Appl. No. 12/792,659, filed Jun. 2, 2010, Office Action, dated Feb. 6, 2012.

(Continued)

*Primary Examiner* — Stephen S Hong
*Assistant Examiner* — Marshon L Robinson
(74) *Attorney, Agent, or Firm* — Hickman Palermo Becker Bingham LLP

(57) ABSTRACT

A method and apparatus are described for summarizing a document. For each node in the document that satisfies a marking criteria, a start and end mark pair is stored in a summary in document order. The start mark specifies a location in the document where the node starts, and the end mark specifies a location in the document where the node ends. When evaluating a query for a hierarchical path, the document is streamed into memory until the mark of a tag matches a start mark in the summary. If that tag does not fit within the path, then streaming of the document may resume at the end mark, thereby skipping the node during streaming evaluation. Translation information may be used to indicate a logical position relative to the marks in the summary when the document is modified.

24 Claims, 4 Drawing Sheets

(56) References Cited

U.S. PATENT DOCUMENTS

| | | | |
|---|---|---|---|
| 6,092,168 | A | 7/2000 | Voigt |
| 6,243,501 | B1 | 6/2001 | Jamiali |
| 6,308,315 | B1 | 10/2001 | Dice |
| 6,421,656 | B1 | 7/2002 | Cheng et al. |
| 6,535,970 | B1 | 3/2003 | Bills et al. |
| 6,549,922 | B1 | 4/2003 | Srivastava et al. |
| 6,728,823 | B1 | 4/2004 | Walker et al. |
| 7,162,485 | B2 | 1/2007 | Gottlob et al. |
| 7,281,206 | B2 | 10/2007 | Schnelle et al. |
| 7,359,910 | B2* | 4/2008 | Wu .................. G06F 17/30908 |
| 7,366,735 | B2 | 4/2008 | Chandrasekar et al. |
| 7,499,915 | B2 | 3/2009 | Chandrasekar et al. |
| 7,533,138 | B1 | 5/2009 | Martin |
| 7,660,719 | B1 | 2/2010 | Darniba |
| 7,680,764 | B2 | 3/2010 | Chandrasekar et al. |
| 7,734,631 | B2 | 6/2010 | Richardson et al. |
| 7,849,069 | B2* | 12/2010 | Liu .................. G06F 17/30545 |
| | | | 707/707 |
| 7,870,124 | B2 | 1/2011 | Liu et al. |
| 7,885,980 | B2 | 2/2011 | Tarachandani et al. |
| 7,917,515 | B1 | 3/2011 | Lemoine |
| 8,024,329 | B1 | 9/2011 | Rennison |
| 8,090,731 | B2 | 1/2012 | Sthanikam et al. |
| 8,156,430 | B2* | 4/2012 | Newman .................. G06Q 10/107 |
| | | | 715/255 |
| 8,244,984 | B1 | 8/2012 | Glasco et al. |
| 8,255,394 | B2 | 8/2012 | Branigan et al. |
| 8,321,478 | B2 | 11/2012 | Fong |
| 8,370,452 | B2 | 2/2013 | Harvell et al. |
| 8,429,522 | B2* | 4/2013 | Stanciu .................. G06F 17/2247 |
| | | | 715/221 |
| 2002/0065822 | A1 | 5/2002 | Itani |
| 2002/0078104 | A1 | 6/2002 | Kagimasa |
| 2002/0147748 | A1 | 10/2002 | Huang et al. |
| 2003/0014397 | A1 | 1/2003 | Chau et al. |
| 2003/0035000 | A1 | 2/2003 | Licon et al. |
| 2003/0088558 | A1 | 5/2003 | Zaharioudakis et al. |
| 2003/0120671 | A1 | 6/2003 | Kim et al. |
| 2003/0158854 | A1 | 8/2003 | Yoshida et al. |
| 2003/0196010 | A1 | 10/2003 | Forin |
| 2004/0117736 | A1* | 6/2004 | Newman .................. G06Q 10/107 |
| | | | 715/256 |
| 2004/0210573 | A1 | 10/2004 | Abe et al. |
| 2005/0066134 | A1 | 3/2005 | Tormasov |
| 2005/0131875 | A1 | 6/2005 | Riccardi et al. |
| 2005/0183041 | A1* | 8/2005 | Chiu .................. G06F 3/04815 |
| | | | 715/850 |
| 2005/0203957 | A1 | 9/2005 | Wang et al. |
| 2005/0228828 | A1 | 10/2005 | Chandrasekar et al. |
| 2005/0240649 | A1 | 10/2005 | Elkington et al. |
| 2005/0273728 | A1* | 12/2005 | Williams .................. G06F 3/0481 |
| | | | 715/809 |
| 2005/0289175 | A1 | 12/2005 | Krishnaprasad et al. |
| 2006/0106890 | A1 | 5/2006 | Paul et al. |
| 2006/0112135 | A1 | 5/2006 | Warshawsky |
| 2006/0161569 | A1 | 7/2006 | Meyer |
| 2006/0167928 | A1 | 7/2006 | Chakraborty et al. |
| 2006/0212800 | A1* | 9/2006 | Kamiya .................. G06F 17/2247 |
| | | | 715/236 |
| 2006/0242574 | A1 | 10/2006 | Richardson et al. |
| 2007/0005297 | A1 | 1/2007 | Beresniewicz |
| 2007/0016604 | A1 | 1/2007 | Murthy et al. |
| 2007/0016605 | A1 | 1/2007 | Murthy et al. |
| 2007/0083575 | A1 | 4/2007 | Leung |
| 2007/0100793 | A1 | 5/2007 | Brown et al. |
| 2007/0198479 | A1 | 8/2007 | Cai et al. |
| 2007/0198568 | A1 | 8/2007 | Luo |
| 2007/0208540 | A1 | 9/2007 | Eerd |
| 2007/0234199 | A1 | 10/2007 | Astigeyevich |
| 2007/0239792 | A1 | 10/2007 | Chen |
| 2007/0240035 | A1 | 10/2007 | Sthanikam et al. |
| 2007/0271243 | A1 | 11/2007 | Fan et al. |
| 2007/0299811 | A1 | 12/2007 | Chandrasekar et al. |
| 2008/0091623 | A1 | 4/2008 | Idicula et al. |
| 2008/0092034 | A1* | 4/2008 | Lim .................. G06F 17/30923 |
| | | | 715/234 |
| 2008/0114725 | A1 | 5/2008 | Indeck et al. |
| 2008/0147614 | A1 | 6/2008 | Tam Man-Hay et al. |
| 2008/0154893 | A1 | 6/2008 | Ting et al. |
| 2008/0215878 | A1 | 9/2008 | Gemmo |
| 2008/0222176 | A1 | 9/2008 | Cai et al. |
| 2008/0263008 | A1 | 10/2008 | Beyer et al. |
| 2008/0301129 | A1 | 12/2008 | Milward et al. |
| 2009/0024578 | A1 | 1/2009 | Wang et al. |
| 2009/0089263 | A1 | 4/2009 | McHugh et al. |
| 2009/0113350 | A1* | 4/2009 | Hibino .................. G06F 17/30061 |
| | | | 715/853 |
| 2009/0125480 | A1 | 5/2009 | Zhang et al. |
| 2009/0150412 | A1 | 6/2009 | Idicula et al. |
| 2009/0157722 | A1 | 6/2009 | Liu et al. |
| 2009/0228604 | A1* | 9/2009 | Miyazaki .................. H04L 45/00 |
| | | | 709/238 |
| 2009/0265339 | A1 | 10/2009 | Chen et al. |
| 2010/0145929 | A1 | 6/2010 | Burger et al. |
| 2010/0163621 | A1 | 7/2010 | Ben-Asher |
| 2010/0312771 | A1 | 12/2010 | Richardson et al. |
| 2011/0047589 | A1 | 2/2011 | Bennett |
| 2011/0106811 | A1 | 5/2011 | Novoselsky et al. |
| 2011/0131212 | A1 | 6/2011 | Shikha |
| 2011/0153630 | A1 | 6/2011 | Vernon |
| 2011/0179085 | A1 | 7/2011 | Hammerschmidt et al. |
| 2011/0208730 | A1 | 8/2011 | Jiang et al. |
| 2011/0246868 | A1* | 10/2011 | Stanciu .................. G06F 17/2247 |
| | | | 715/223 |
| 2011/0289118 | A1* | 11/2011 | Chen .................. G06F 17/30917 |
| | | | 707/803 |
| 2012/0020209 | A1 | 1/2012 | Ghosh |
| 2012/0221732 | A1 | 8/2012 | Waldspurger |
| 2016/0041763 | A1 | 2/2016 | Idicula et al. |

OTHER PUBLICATIONS

U.S. Appl. No. 12/871,869, filed Aug. 30, 2010, Office Action, dated May 9, 2012.

U.S. Appl. No. 12/792,659, filed Jun. 2, 2010, Office Action, dated May 16, 2012.

U.S. Appl. No. 12/792,659, filed Jun. 2, 2010, Office Action, dated Sep. 10, 2012.

U.S. Appl. No. 12/871,869, filed Aug. 3, 2012, Notice of Allowance, dated Oct. 11, 2012.

U.S. Appl. No. 12/491,981, filed Jun. 25, 2009, Final Office Action, dated Nov. 21, 2012.

U.S. Appl. No. 12/792,659, filed Jun. 2, 2010 Notice of Allowance, dated Feb. 5, 2013.

U.S. Appl. No. 12/631,985, filed Dec. 7, 2009, Office Action, dated May 13, 2013.

U.S. Appl. No. 12/690,820, filed Jan. 20, 2010, Office Action, dated Jan. 17, 2012.

U.S. Appl. No. 12/389,306, filed Feb. 19, 2009, Final Office Action, dated Feb. 22, 2011.

U.S. Appl. No. 12/690,820, filed Jan. 20, 2010, Notice of Allowance, dated Apr. 11, 2012.

U.S. Appl. No. 12/389,306, filed Feb. 19, 2009, Office Action, dated Apr. 27, 2012.

U.S. Appl. No. 12/690,820, filed Jan. 20, 2010, Notice of Allowance, dated Jul. 9, 2012.

U.S. Appl. No. 10/918,054, filed Aug. 12, 2004, Notice of Allowance, dated Sep. 20, 2012.

U.S. Appl. No. 12/389,306, filed Feb. 19, 2009, Final Office Action, dated Feb. 15, 2013.

U.S. Appl. No. 12/389,306, filed Feb. 19, 2009, Advisory Action, dated Jun. 5, 2013.

U.S. Appl. No. 12/389,306, filed Feb. 19, 2013, Office Action, dated Jun. 25, 2013.

U.S. Appl. No. 12/961,394, filed Dec. 6, 2010, Office Action, dated Feb. 12, 2013.

U.S. Appl. No. 12/961,394, filed Dec. 6, 2010, Final Office Action, dated Sep. 23, 2013.

(56) References Cited

OTHER PUBLICATIONS

U.S. Appl. No. 12/389,306, filed Feb. 19, 2009, Final Office Action, dated Sep. 30, 2013.
U.S. Appl. No. 12/961,394, filed Dec. 6, 2010, Interview Summary, dated Nov. 6, 2013.
U.S. Appl. No. 12/961,394, filed Dec. 6, 2010, Advisory Action, dated Dec. 3, 2013.
U.S. Appl. No. 12/491,981, filed Jun. 25, 2009, Restriction Requirement, dated Dec. 8, 2011.
U.S. Appl. No. 12/491,981, filed Jun. 25, 2009, Office Action, dated Apr. 11, 2012.
U.S. Appl. No. 12/491,981, filed Jun. 25, 2009, Advisory Action, dated Feb. 27, 2013.
U.S. Appl. No. 12/491,891, filed Jun. 25, 2009, Office Action, dated Aug. 26, 2013.
U.S. Appl. No. 12/491,981, filed Jun. 25, 2009, Notice of Allowance, dated Dec. 17, 2013.
Berglund et al., "XML Path Language (Xpath) 2.0", W3C Recommendation, Jan. 2007, 115 pages.
Melton, Jim, et al., "XML Syntax for XQuery 1.0 (XQueryX)", W3C Recommendation, Jan. 23, 2007, 43 pages.
Snelson, John et al. "XQuery Scripting Extension 1.0", W3C Working Draft, Apr. 8, 2010, 34 pages.
Clark, James et al., "XML Path Language (XPath) Version 1.0", W3C Recommendation, Nov. 16, 1999, 37 pages.
Zhang et al., "Binary XML Storage and Query Processing in Oracle 11g", VLDB, dated Aug. 2009, 12 pages.
European Patent Office, "Office Action" in application No. PCT/US2011/063310, dated Aug. 12, 2013, 16 pages.
Current Claims in application No. PCT/US2011/063310, dated Aug. 2013, 4 pages.
Bremer et al., "Integrating Document and Data Retrieval Based on XML", dated Aug. 12, 2005, 31 pages.
Pal et al., "Indexing XML Data Stored in a Relational Database", Proceedings of the $30^{th}$ VLDB Conference, Toronto, Canada, dated 2004, 12 pages.
U.S. Appl. No. 12/961,394, filed Dec. 6, 2010, Notice of Allowabliity, dated Sep. 21, 2015.
U.S. Appl. No. 12/961,394, filed Dec. 6, 2010, Notice of Allowance, dated May 6, 2015.
Idicula, U.S. Appl. No. 14/886,032, filed Oct. 17, 2015, Office Action, dated Apr. 28, 2017.
U.S. Appl. No. 12/961,394, filed Dec. 6, 2010, Office Action, dated Oct. 1, 2014.
U.S. Appl. No. 14/886,031, filed Oct. 17, 2015, Office Action, dated Jan. 23, 2017.
Idicula, U.S. Appl. No. 14/886,031, filed Oct. 17, 2015, Advisory Action, dated Jan. 3, 2018.
Idicula, U.S. Appl. No. 14/866,031, filed Oct. 17, 2015, Interview Summary, dated Nov. 24, 2017.
Idicula, U.S. Appl. No. 14/886,031, filed Oct. 17, 2015, Final Office Action, dated Sep. 1, 2017.

\* cited by examiner

TECHNIQUE FOR SKIPPING IRRELEVANT PORTIONS OF DOCUMENTS DURING STREAMING XPATH EVALUATION

PRIORITY CLAIM

This application claims benefit under 35 U.S.C. § 120 as a Continuation of application Ser. No. 12/491,981, filed on Jun. 25, 2009, the entire contents of which are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

RELATED APPLICATIONS

The present application is related to U.S. Patent Application Publication No. 2009/0024578, entitled Delta Operations On A Large Object In A Database, filed by Shaoyu Wang, et al. on Jul. 20, 2007, the entire contents of which are incorporated herein by reference.

FIELD OF THE INVENTION

The present invention relates to streaming evaluation of a query on a document.

BACKGROUND

"Streaming X-Path Evaluation" is a technique used to evaluate the results of an xpath based query over an XML document. For example, a query of the form, "Find all nodes matching the xpath expression '/a/b/c' in document xyz.xml," can be evaluated using streaming xpath evaluation. To evaluate a query using streaming xpath evaluation, a linear scan is performed on the entire XML document, keeping track of state information in order to compute the required results.

Specifically, streaming xpath evaluation engines process or "stream" the entire XML document, looking for nodes that match the given xpath expression. A state machine is used to keep track of the current location inside the XML document. If the current location matches the given xpath, then a result node is added to the result set.

The streaming xpath evaluation engine may traverse the entire document each time a query is evaluated, regardless of the input path expression. The process of traversing the entire document is highly inefficient if the input XML document is a large document, consisting of large subtrees that do not match the given xpath.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
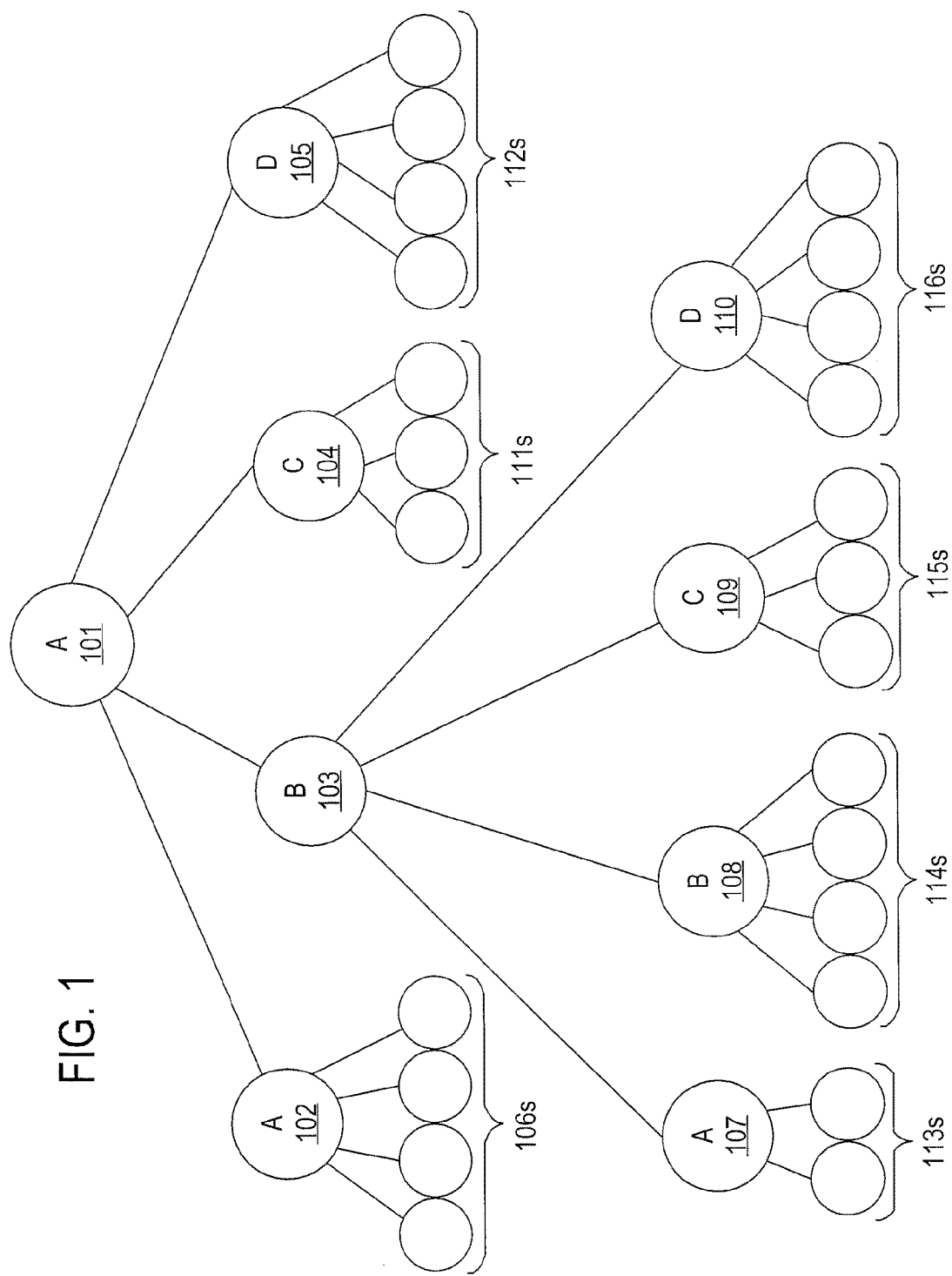
FIG. 1 is a diagram illustrating a conceptual layout of an example set of nodes in an example XML document.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Specific techniques are described for summarizing an XML document. However, the techniques described herein are not limited to XML documents. The techniques may be used to summarize any document that comprises one or more nodes of hierarchical markup data. In one embodiment, the nodes of hierarchical markup data are represented in a hierarchical markup language such as XML. The nodes begin and end in the XML document, and, solely for the purpose of illustration, the nodes may be depicted in a node tree model such as the node tree model illustrated in FIG. 1.

A summary is created for the XML document. In one embodiment, a pair of sub-tree marks (start mark, end mark) for a node from the XML document is stored in the summary in document order. The start mark of a node specifies a location of the beginning of the node in a representation of an XML document, and the end mark of the node specifies a location in the XML document of the end of the node. By comparing marks of nodes, it may be determined whether or not one node contains another node. If the start mark of a node is after the start mark of another node, and the end mark of the node is before that of the other node, the node is a sub-node of the other node. If a node is to be skipped during streaming evaluation, then skipping to the end mark of the node also skips the sub-nodes of the node.

In one embodiment, a node is added to the summary when the node satisfies a "marking criteria." The marking criteria may include any information about the nodes, such as the size of the node, the number of sub-nodes of the node, the tag name of the node and sub-nodes, and the value of the node and sub-nodes. For example, marks for all nodes above a certain size may be stored in the summary to represent where the large nodes start and end in the XML document.

To evaluate a query for a path, in one embodiment a streaming evaluation engine reads the summary into memory and streams the XML document into memory until the current location of the XML document matches a start mark in the summary. As the XML document is streamed into memory, nodes matching the path are added to a result set. When the current location of the XML document matches the start mark in the summary, the streaming evaluation engine determines whether a node at the current location fits within the path. If the node fits within the path, then the streaming evaluation engine may continue to traverse the node. If the node matches the path, then the node is added to the result set. If the node does not fit within the path, then the streaming evaluation engine may continue at the position indicated by the end mark stored in the summary for the node, thereby skipping the node during streaming evaluation. Skipping the node saves time otherwise spent traversing the node.

Summarization information may be updated whenever the XML document is modified. In one embodiment, modifications are tracked for a set of nodes in the XML document, and the marks in the summary are updated based on the modifications. In another embodiment, translation information is stored based on the modifications. The translation information indicates a logical position relative to the marks. In one embodiment, if a node not represented in the summary has been modified to satisfy the marking criteria, then marks for the node are added to the summary. In another embodiment, if a node represented in the summary has been modified so that it does not satisfy the marking criteria, then marks for the node are deleted from the summary.

XML Documents

XML documents are an example of a body of data that conforms to hierarchical markup language, such as XML. A hierarchical markup language provides for marking up a body of data, referred to herein as a document, into a tree of elements. XML is a hierarchical markup language that allows tagging of document elements and provides for the definition, transmission, validation, and interpretation of data between applications and between organizations. Other examples of markup languages include HTML and SGML.

A document that conforms to a hierarchical markup language can be represented by a hierarchy of nodes that reflects the documents hierarchical nature. A hierarchy of nodes is composed of nodes at multiple levels. The nodes at each level are each linked to one or more nodes at a different level. Each node at a level below the top level is a child node of one or more of the parent nodes at the level above. Nodes at the same level are sibling nodes.

In a tree hierarchy or node tree, each child node has only one parent node, but a parent node may have multiple child nodes. In a tree hierarchy, the node that has no parent node linked to it is the root node, and a node that has no child nodes linked to it is a leaf node. A tree hierarchy has a single root node. In a node tree that represents an XML document, a node can correspond to an element, and the child nodes of the node correspond to an attribute or another element contained in the element.

Nodes of XML documents are typically read in a logical order, but XML data may be physically stored on disk in any of a number of formats and in any order. When reading XML data stored on disk out of order, a logical representation of the XML documents may be reconstructed in memory from the physically stored data on disk. As used herein, the "location" in an XML document refers to the location in an in-order representation of the XML document, which may be reconstructed in memory or physically stored on disk.

In XML, data items known as elements are delimited by an opening tag and a closing tag. An element may also comprise attributes, which are specified in the opening tag of the element. Text between the tags of an element may represent any sort of data value, such as a string, date, or integer. Text within an element may alternatively represent one or more elements. Elements, attributes, and values may form nodes on the tree.

The nodes may have a number of characteristics, such as node size, number of sub-nodes, tag name and sub-node tag names, and value and sub-node values. The node tree concept applies to XML documents even when the node tree is not constructed or stored in memory. In other words, node relationships can be inferred as an XML document is read, without constructing the node tree for the entire document. For example, if Y is nested within X, then Y can be represented as a sub-node of X.

The location of an element node may be indicated by the location of the start and end tags of the element node. In one embodiment, attribute nodes and value nodes may be rewritten in the same tagged format as element nodes. In another embodiment, the location of the beginning of an attribute node or value node is the location in the representation of the XML document where the attribute node or value node begins to be declared or stated, and the end of an attribute node or value node is the location in the representation of the XML document where the declaration or statement of the attribute node or value node is complete.

Summarizing XML Documents

One or more nodes may be selected from the nodes in an XML document based at least in part on one or more node characteristics. In one embodiment, a start mark and an end mark of each selected node is stored in a summary when the XML document is inserted into the XML database, while parsing or encoding the document. In one embodiment, the summary is stored as metadata that is linked to the XML document.

One example of selecting nodes based on node size includes selecting nodes that are 1,000 KB or larger in size. In the example, a node of 1,000 KB would be selected, but a node of 500 KB would not be selected. The selected large nodes may be skipped when evaluating a query if they are irrelevant to the query.

Also, nodes that have three or more sub-nodes may be selected. In one embodiment, the number of sub-nodes includes all descendants of the node. In another embodiment, the number of sub-nodes includes only children of the node. In the example, a node with three sub-nodes would be selected, but a node with two sub-nodes would not be selected. The selected nodes with large sub-trees may be skipped when evaluating a query if they are irrelevant to the query.

In another example, nodes with tag names that include a keyword such as "paragraph" or "p" may be selected. In the example, nodes with tags such as "<Paragraph>," "<p>," and "<Paragraph 5>" would be selected, but nodes with tags such as "<Title>" would not be selected. The selected paragraph nodes may be skipped when evaluating a query if the query is not for a paragraph node.

Alternately, nodes with tag names that do not include a keyword such as "title" may be selected. In this example, nodes such as "<0005>," "<p>," and "<summary>" would be selected, leaving nodes such as "<Title>" not selected. The selected non-title nodes may be skipped when evaluating a query if the query is for a title node.

One example of selecting nodes based on value involves selecting nodes that do not contain the phrase "car" in the value of the node or any sub-nodes of the node. The nodes not containing "car" also would not contain "carpool." Therefore, the selected nodes that do not contain "car" may be skipped when evaluating a query if the query is for a node containing "carpool" or just "car."

In one embodiment, the XML document is summarized based on the selected nodes so that the selected nodes may be skipped when performing a streaming evaluation of a query on the XML document. In a particular embodiment, the summary includes pairs of sub-tree marks (start mark, end mark) for each selected node. When evaluating a query using streaming evaluation, the start mark indicates skip-from locations in the XML document, and the end mark indicates skip-to locations in the XML document.

In one embodiment, the pairs of sub-tree marks (start mark, end mark) are stored in the summary in the order that the nodes associated with the sub-tree marks start in the XML document. Storing the summary in order allows a summary pointer to be efficiently maintained when evaluating a query. If maintained, the summary pointer may indicate the next relevant start mark in the summary. The pairs of marks after the summary pointer include marks that are associated with nodes after the current position in the XML document, i.e. nodes that have yet to be traversed or skipped. The pairs of marks before the summary pointer include marks that are associated with nodes before the current position in the XML document, i.e. nodes that have already been traversed or skipped. In one embodiment, a node starting at a current position in the XML document may be found in the summary when the current position in the XML document matches the start mark at the summary pointer.

FIG. 1 illustrates a conceptual layout of an example set of nodes in an example XML document. Node 101 ("A") is the root node. Nodes 102-105 are children of A. For example, Node 102 ("A") has the path "A/A," and node 103 ("B") has the path "A/B." Node 102 has four children 106s; node 103 has four children (107, 108, 109, and 110); node 104 ("C") has four children 111s; and, node 105 ("D") has four children 112s. Node 107 ("A") has the path "A/B/A" because node 107 is a child of node 103 ("B"), which is a child of node 101 ("A"). Node 107 has two children 113s; node 108 ("B") has four children 114s; node 109 ("C") has three children 115s; and, node 110 has four children 116s.

Figure 2:
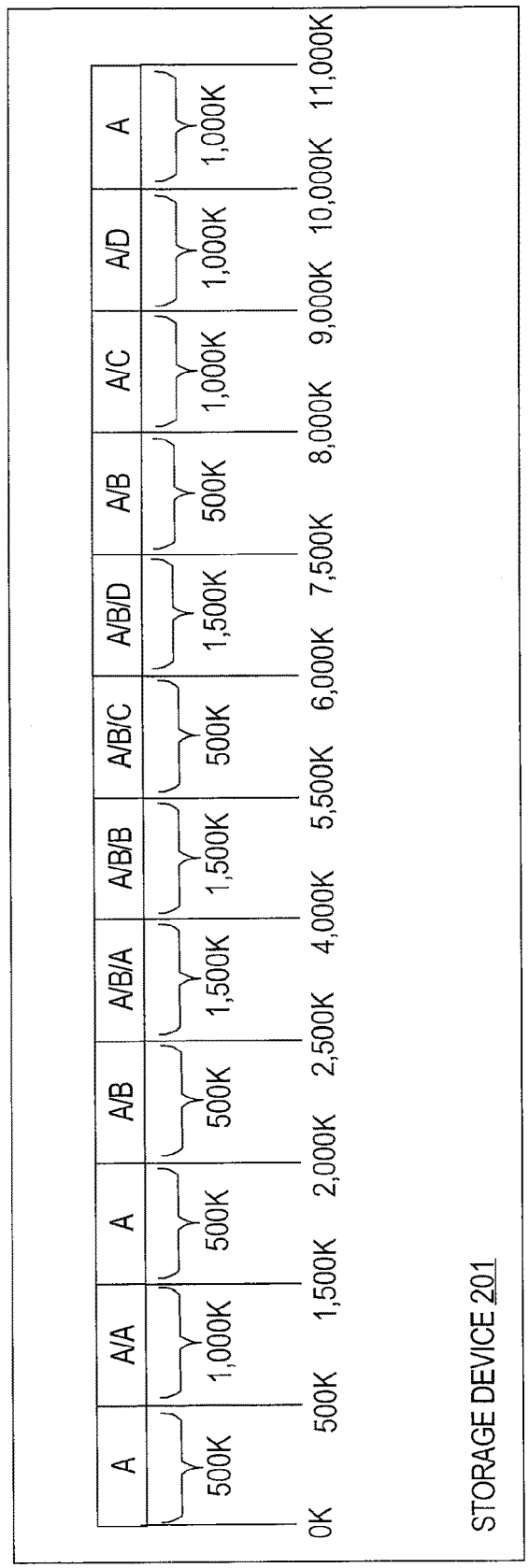
FIG. 2 is a diagram illustrating an example representation in memory of the example set of nodes shown in FIG. 1.

FIG. 2 shows an example representation in memory of the example set of nodes in FIG. 1. Referring to FIG. 2, the nodes conceptually presented in FIG. 1 are shown on storage medium 201. Node A starts at offset 0K, where the XML document starts, and continues to offset 11,000K where the XML document ends. Data is stored in node A outside of the nodes identified in FIG. 1 at offsets 0K through 500K, offsets 1500K+1 through 2,000K, and offsets 10,000K+1 through 11,000K. Node A/A, identified as node 102 in FIG. 1, starts at offset 500K+1 and continues for 1,000K to offset 1,500K.

Other node positions and sizes are apparent from FIG. 2.

Figure 3:
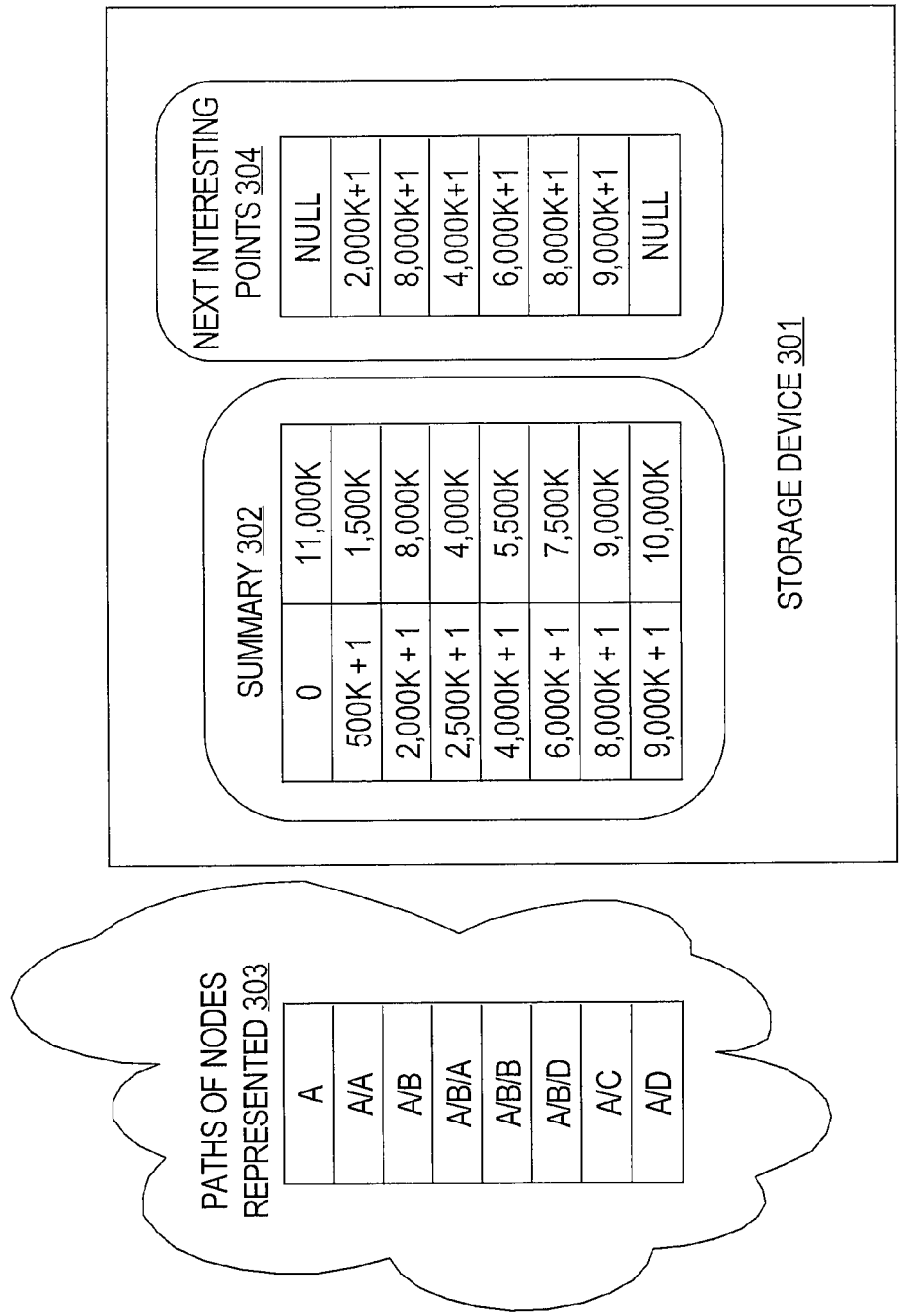
FIG. 3 is a diagram illustrating an example summary created for the XML document shown in FIG. 1 and FIG. 2.

FIG. 3 illustrates an example summary created for the XML document illustrated conceptually in FIG. 1 and FIG. 2. In FIG. 3, summary 302 is stored in a storage medium 301. It is not necessary to store or keep track of next interesting point 304. For illustrative purposes only, next interesting point 304 and summary 302 are shown on the same storage medium 301.

As shown, summary 302 stores a pair of marks for each node larger than 1000K in size. Node 109, with path "A/B/C," does not appear in the summary because the node is only 500K in size. On the other hand, node 107, with path "A/B/A," does appear in the summary because the node is 1,500K in size. The summary is shown with two columns of marks, but the summary may also be stored as a serial listing of marks, such as: "$a_o$ $a_1$ $b_o$ $b_1$ $c_o$ $c_1$ $d_o$ $d_1$ . . . ," where $x_o$ is a start mark and $x_1$ is an end mark. A person of ordinary skill would know of several different ways to store the marks in the summary, and the techniques described herein are not limited to a particular method of storing the marks in the summary.

Other node characteristics, as discussed, may also be used to determine which nodes are represented in the summary. For example, if the summary included only nodes with three or more sub-nodes, then marks for node 107 would not appear in the summary. Marks for node 109 would appear in the summary because node 109 has three sub-nodes even though node 109 is only 500K. In another embodiment, the summary includes nodes with three or more sub-nodes and nodes that are 1000K or larger. In the other embodiment, the summary would include both node 107 (due to node size) and node 109 (due to the number of sub-nodes).

Evaluating Queries Using Summary

When a query on an XML document is submitted for processing by a streaming evaluation engine, a summary linked to the XML document is read into memory. In one embodiment, the streaming evaluation engine reads the XML document in chunks of 4 KB. Other chunk sizes can also be used. The streaming evaluation engine keeps track of the current location in the XML document as the XML document is streamed.

In one embodiment, the streaming evaluation engine determines whether the current location in the XML document matches the first start mark in the summary. If the summary is stored in document order, then the first start mark in the summary will be the first start mark encountered by the streaming evaluation engine. In another embodiment, the streaming evaluation determines whether the current location in the XML document matches any mark in the summary.

When the current location in the XML document matches the first start mark in the summary, the streaming evaluation engine determines whether or not to skip the node represented by the first pair of (start mark, end mark). In one embodiment, the streaming evaluation engine compares the path of the node at the current location in the XML document with the target path of the query. If the path of the node at the current location is either a prefix of the target path or matches the target path, then the node is relevant and is not skipped. For example, if the target path is "A/B/C," then the path of node 103, "A/B," is a prefix of the target path. In another example, the path of node 109 matches the target path. If the path of the node at the current location matches the target path, then the node may be added to a result set.

If the path of the node at the current location is not a prefix of the target path and does not match the target path, then the node can safely be skipped. For example, node 102, with path "A/A" may be safely skipped when the target path is "A/B/C."

If the streaming evaluation engine determines to skip the node, then the end mark in the summary is used to locate the end of the node in the XML document. The current location in the XML document is updated to the end mark, and the streaming evaluation engine resumes streaming the XML document at the end of the node. By detecting the start mark of the node in the summary and resuming streaming at the end mark, the evaluation engine avoids traversing the node. In other words, the streaming evaluation engine skips the node.

In one embodiment, a summary pointer is used to keep track of the next relevant start mark in the summary. When the streaming evaluation engine reads a start mark and determines not to skip the node in the XML document, the summary pointer is updated to point to the next start mark in the summary. When the streaming evaluation engine determines to skip from a start mark to an end mark, several pairs of marks in the summary may be skipped by the summary pointer. In other words, merely updating the summary pointer to the next start mark in the summary may not be sufficient. When a skip occurs, in one embodiment, the summary pointer is updated based on the end mark skipped to. Specifically, the summary pointer is updated to point to the next start mark that is greater than the end mark that was used to determine the skip-to location. In another embodiment, the summary pointer is updated based on a cached next interesting point for the end mark that was used to determine the skip-to location. The next interesting point indicates the next start mark that is greater than the end mark.

In one example, a particular node contains sub-nodes that are also represented in the summary. Skipping the particular node includes skipping sub-nodes of the particular node. The particular node is skipped by using the summary to locate the end of the particular node in the XML document. The current position of the XML document is updated to match the end mark of the particular node. Also, the summary pointer is updated to point to the next start mark in the summary that would appear when streaming the XML document from the current position. The summary pointer bypasses those marks that are less than or equal to the end mark of the particular node because those marks represent sub-nodes of the particular node. The summary pointer is updated to point to the next interesting point, or the next start mark that is greater than the end mark of the particular node.

Computing and Storing Next Interesting Points

The next interesting point is the next mark in the summary that is useful to the evaluation engine evaluating the XML document. In one embodiment, the next interesting point is the first start mark that is greater than the end mark that was used to determine the skip-to location. In one embodiment, next interesting points are stored in memory, but not in the summary. Next interesting points introduce additional overhead when reading and updating the summary. In another embodiment, the next interesting points for each pair are stored in the summary.

When next interesting points are not stored in the summary, the next interesting points may be stored in memory along with an in-memory representation of the summary. Computing the next interesting point for a particular node may include reading marks for hundreds of sub-nodes of the particular node in the summary. If the summary is used more than once while the summary is in memory, then storing the next interesting points in memory can save the time of having to re-compute the next interesting points when evaluating the XML document.

In one embodiment, the next interesting points are computed the first time the summary is read. A stack is used to maintain the most recent pair of marks without a next interesting point. In one embodiment, when an end mark of the summary is read into memory, the end mark is pushed to the stack. If the next start mark is greater than the end mark, then the next start mark is stored as the next interesting point for the end mark. The end mark is popped from the stack when it is assigned a next interesting point.

Referring to FIG. 3, next interesting points 304 are assigned to pairs of marks in summary 302. The paths of nodes represented 303 are provided to aid in an understanding of the figures, and the paths 103 do not need to actually be stored.

In one example, a query with a target path of "A/C" is evaluated by the streaming evaluation engine. In one embodiment, the current position in the XML document starts at 0, for which the first mark in the summary is detected. The streaming evaluation engine determines to continue traversing the document because the path of node 101, "A," is a prefix of the target path "A/C." If the next interesting point for node 101 has not been determined, then the end mark for node 101 is pushed to the stack, which may result in STACK: 11,000K.

The streaming evaluation engine continues traversing the document until it reaches node 102 at the current position of 500K+1. The streaming evaluation engine determines to skip node 102 because the path of node 102, "A/A," does not match the target path "A/C." The streaming evaluation engine reads the end mark for node 102 and changes the current position in the XML document to 1,500K. The end mark for node 102 is pushed to the stack, and the summary pointer moves to the next start mark, 2,000K+1. Because 2,000K+1 is greater than 1,500K, the value of 2,000K+1 is stored as the next interesting point for node 102. The value of 1,500K is popped from the stack, leaving STACK: 11,000K.

Similarly, the streaming evaluation engine determines to skip node 103 because the path of node 103, "A/B," does not match the target path "A/C." After skipping "A/B," the STACK may include: 11,000K; 8,000K; 4,000K.

To update the next interesting points as node "A/B" is skipped, the summary pointer moves to the next start mark, 4,000K+1. The value of 4,000K+1 is stored as the next interesting point for node 106, and the end mark of node 107 is pushed to the stack. Similarly, 6,000K+1 is stored as the next interesting point for node 107, and the end mark for node 109 is pushed to the stack. Then, the value of 8,000K+1 is stored as the next interesting point for node 109. The value of 8,000K+1 is also stored as the next interesting point for node 103. The value of 8,000K is popped from the stack, leaving STACK: 11,000K.

The summary pointer is moved to 8,000K+1, and the streaming evaluation engine traverses the document from the skipped-to location to reach node 104 at the position of 8,000K+1. The streaming evaluation engine determines to add node 104 to a result set because the path of node 104, "A/C," matches the target path "A/C."

In one embodiment, the streaming evaluation continues until it reaches the end of the document. When the process is complete, a next interesting point is assigned to each of the nodes represented in the summary. The example summary allowed the streaming evaluation engine to skip nodes 102, 103, 107, 108, 109, 110, and 105 in order to evaluate a query for the path "A/C." In another embodiment, the streaming evaluation engine stops when the streaming evaluation engine reaches the target path "A/C."

With the next interesting points and the summary stored in memory, another query may be evaluated on the XML document without re-computing the next interesting points. For example, if the streaming evaluation engine determines to skip node 103 for a subsequent query, then the streaming evaluation engine retrieves from memory that 8,000K+1 is the next interesting point for node 103. The summary pointer is moved directly to the mark of 8,000K+1, and the evaluation engine continues evaluation at the skipped-to location of 8,000K.

Updating the Summary

The summary may be updated when the XML document is modified. In one embodiment, nodes that have been modified are detected, and the modifications made to the nodes are determined.

An update to the XML document can be considered a "fragment replace" operation, where old data is replaced by new data. In the case of inserts, the old data is null. In the case of deletes, the new data is null. When a fragment is replaced, marks in the summary that fall within the boundaries of the fragment are replaced with marks corresponding to the new data. The summary is deleted when the source XML document is deleted.

Nodes that did not satisfy the marking criteria before modification may satisfy the marking criteria after modification. In one embodiment, the summary is updated by adding marks to the summary for nodes that have been modified to satisfy the marking criteria but are not in summary.

Nodes that satisfied the marking criteria before modification may not satisfy the marking criteria after modification. In one embodiment, the summary is updated by deleting marks from the summary for modified nodes that do not satisfy the marking criteria but are in summary.

Modifications to nodes may change the marks of the modified nodes and of other nodes. Adding data to a first node may cause marks for a second node to be positively shifted. Conversely, deleting data from a first node may cause marks for a second node to be negatively shifted. In one embodiment, the marks in the summary are updated based on modifications to the XML document.

Sliding Inserts of Marks

A computer may be programmed to modify data inside a database large object (LOB) whose structure is not known, without modifying other data in the remainder of the LOB. Hence, insertion of new data at a specified location in the LOB does not require movement of any existing data in the LOB. Instead, the computer is programmed to insert new data at a physical end of the LOB. The computer is further programmed to modify metadata for the LOB, based on the specified location. Similarly, deletion of existing data from a specified location in the LOB is performed without movement of other data in the LOB, by updating the metadata. The computer uses the metadata to read from the LOB, so that the new data is read whenever the specified location is accessed.

The computer may be further programmed to optionally output a handle to identify data within the LOB. The handle is designed to be static relative to other insertions and deletions in the LOB. Hence, the handle is used by application(s) in a client computer to build indexes of data in the LOB. For example, such a handle uniquely identifies data of interest to the client, regardless of the number and location of insertions and/or deletions in the remainder of the LOB.

In one embodiment, a translation layer stores a relative position or value of a mark in the summary. Instead of updating and re-ordering the marks in the summary each time the XML document is modified, the translation layer stores a relative position and value to use for translating the physical position and value of the mark into a logical position and value of the mark.

For example, a mark for node 104 ("C") may actually be stored in the summary after the mark for node 105 ("D"). When reading the summary into memory, the translation layer reads a relative position and value for node 104 indicating that node 104 should appear earlier in the summary. Similarly, the translation layer reads a relative position for node 105 indicating that node 105 should appear later in the summary. Logical positions of the marks are determined by the translation layer, and the logical representation of the summary is used by the streaming evaluation engine when evaluating a query on the XML document.

In the example, a 1,000K node such as node 104 is added to the end of a 10,000K document, giving node 104 the physical offsets of 10,000K+1 (start mark) and 11,000K (end mark). When the streaming evaluation engine uses the summary to evaluate a query on the XML document, the translation layer reads a relative value of, for example, −2,000K, in order to compute a logical value of 8,000K+1 for the start mark and 9,000K for the end mark. The logical value appears in FIG. 3 and is used by the streaming evaluation engine when evaluating a query on the XML document.

In one embodiment, the marks in the summary do not change when the XML document is modified. Instead, the translation layer stores information for translating the values of the marks into logical values as they should appear when the summary is used by the streaming evaluation engine to evaluate a query on the XML document.

In one embodiment, when a node that satisfies the marking criteria is added to the XML document, or when a node is modified so that it satisfies the marking criteria, a mark for the node is added to the end of the summary with a start mark indicating the start of the node in the XML document and an end mark indicating the end of the node in the XML document. The translation layer stores information for translating the value and position of the mark into a logical value and position as the mark should appear when the summary is used by the streaming evaluation engine to evaluate a query on the XML document.

In one embodiment, when a node represented in the summary is deleted from the XML document, or when the node is modified so that it no longer satisfies the marking criteria, the marks for the node are actually removed from the summary. The marks for the other affected nodes remain unchanged, and the translation layer stores information for translating the value and position of the marks for the other affected nodes into logical values and positions as the marks should appear when the summary is read into memory.

The translation layer may also store information for translating physical next interesting points into logical next interesting points. For example, the physical next interesting point for a node may remain unchanged when the XML document is modified to add or remove data, but the translation layer may store information for shifting or sliding the physical next interesting point to a logical next interesting point. In one embodiment, the next interesting point is replaced when the next interesting point for a particular node pointed to a mark for a node that was removed from the summary. In another embodiment, the next interesting point is replaced when the next interesting point for a particular node pointed to a mark for a sibling node, and a new mark is added to the summary for a new node between the particular node and the sibling node.

In one embodiment, the marks may be recalculated at any time. The logical value and position of the marks as translated by the translation layer may be calculated and used to replace the physical marks stored in the summary.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
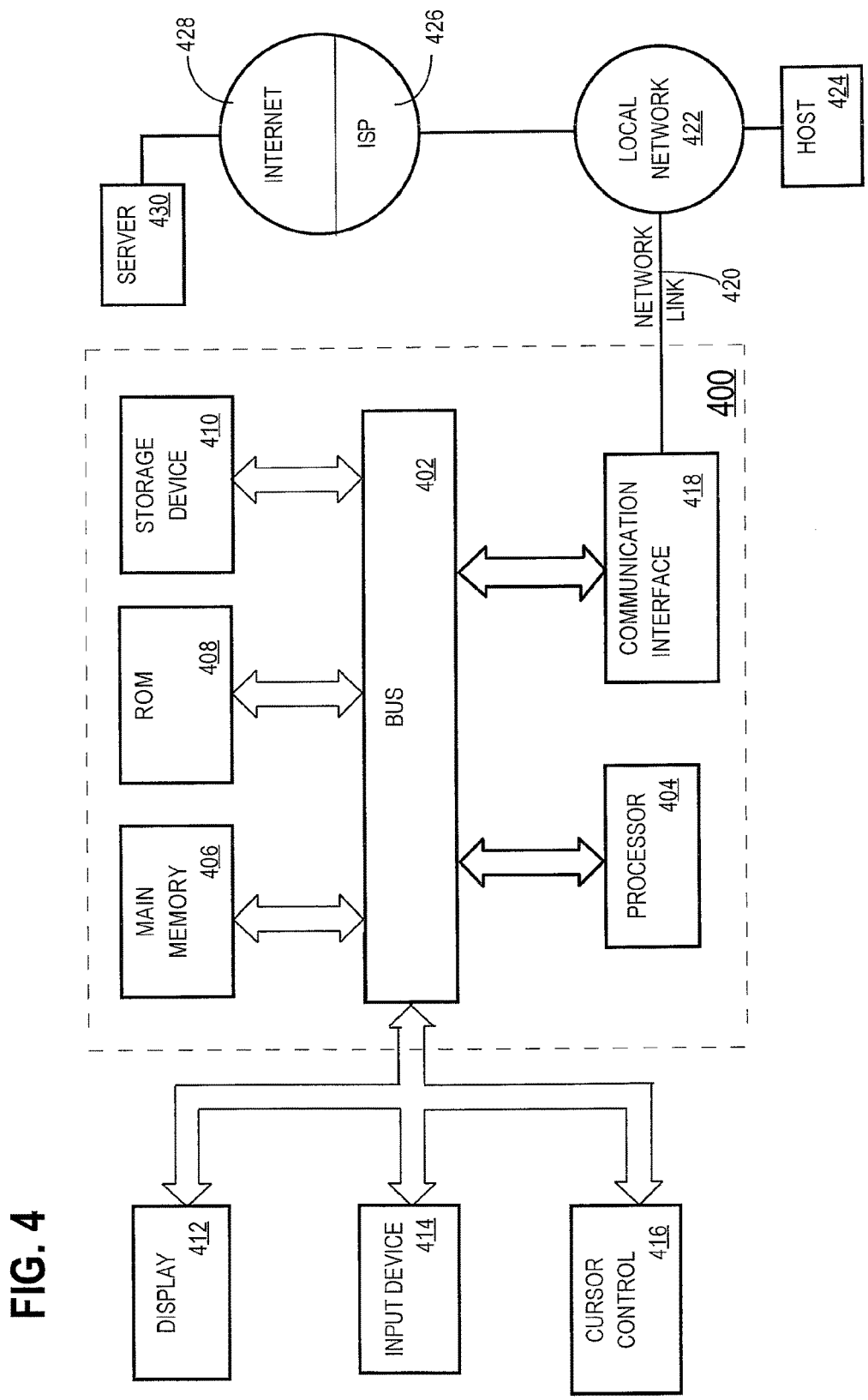
FIG. 4 is a diagram of a system upon which the techniques described herein may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for summarizing a document comprising multiple nodes of hierarchical markup data, the method comprising:
   for each node of said multiple nodes, determining, by one or more computing devices, whether said each node satisfies one or more marking criteria;
   wherein a plurality of nodes of said multiple nodes satisfies said one or more marking criteria;
   for each node of said plurality of nodes, generating, by the one or more computing devices, a respective pair of marks for said each node, the pair of marks comprising a start mark and an end mark for said each node, the start mark specifying a first location in the document where said each node starts, and the end mark specifying a second location in the document that is at or after where said each node ends; and
   for each node of said plurality of nodes, storing the respective pair of marks of said each node ordered based at least in part on the start mark of the respective pair of marks of said each node; and
   evaluating the document against a query for a path, wherein evaluating the document includes:
      determining that a particular node of said plurality of nodes is not within the path; and
      in response to determining that a particular node of said plurality of nodes is not within the path, skipping to the second location in the document specified by the respective pair of marks for the particular node in a summary.

2. The method of claim 1, wherein the one or more marking criteria is a size of a node.

3. The method of claim 1, wherein the one or more marking criteria is a number of subnodes of a node.

4. The method of claim 1, wherein the one or more marking criteria is a name of a node and sub-nodes.

5. The method of claim 1, wherein the one or more marking criteria is a value of a node and sub-nodes.

6. The method of claim 1, wherein the document comprising nodes of hierarchical markup data is a plurality of documents comprising nodes of hierarchical markup data.

7. A method for storing metadata for a document, the method comprising:
   in a summary stored in a large binary object (LOB), storing marks for nodes of the document that satisfy one or more marking criteria, the marks comprising start marks and end marks, the start marks specifying first locations in the document where nodes start, and the end marks specifying second locations in the document at or after where nodes end;
   determining that one or more modifications have been made to a set of nodes in the document;
   based at least in part on the one or more modifications, storing a logical value relative to at least one of the marks stored in the summary at a physical end of the LOB.

8. The method of claim 7, wherein the one or more modifications include adding data to the set of nodes in the document, and wherein the logical value indicates a positive value relative to the at least one of the marks.

9. The method of claim 7, wherein the one or more modifications include deleting data from the set of nodes in the document, and wherein the logical value indicates a negative value relative to the at least one of the marks.

10. The method of claim 7, further comprising:
    determining that one or more nodes of the set of nodes satisfies one or more marking criteria;
    determining that the summary does not include marks for the one or more nodes of the set of nodes;
    adding marks to a new position in the summary for the one or more nodes; and
    storing a logical position that indicates a position relative to the new position of the added marks.

11. The method of claim 7, further comprising:
    determining that one or more nodes of the set of nodes does not satisfy one or more marking criteria;
    determining that the summary includes marks for the one or more nodes of the set of nodes;
    deleting marks from the summary for the one or more nodes.

12. The method of claim 7, wherein the document is one or more documents that conform to a hierarchical markup language.

13. One or more non-transitory computer-readable storage medium storing one or more sequences of instructions, wherein execution of the one or more sequences of instructions by one or more processors causes:
    for a document comprising multiple nodes of hierarchical markup data, for each node of said multiple nodes, determining, by one or more computing devices, whether said each node satisfies one or more marking criteria;
    wherein a plurality of nodes of said multiple nodes satisfies said one or more marking criteria;
    for each node of said plurality of nodes, generating, by the one or more computing devices, a respective pair of marks for said each node, the pair of marks comprising a start mark and an end mark for said each node, the start mark specifying a first location in the document where said each node starts, and the end mark specifying a second location in the document that is at or after where said each node ends; and
    for each node of said plurality of nodes, storing the respective pair of marks of said each node ordered based at least in part on the start mark of the respective pair of marks of said each node; and
    evaluating the document against a query for a path, wherein evaluating the document includes:
       determining that a particular node of said plurality of nodes is not within the path; and
       in response to determining that a particular node of said plurality of nodes is not within the path, skipping to the second location in the document specified by the respective pair of marks for the particular node in a summary.

14. One or more non-transitory computer-readable storage medium storing one or more sequences of instructions, wherein execution of the one or more sequences of instructions by one or more processors causes:
in a summary stored in a large binary object (LOB), storing marks for nodes of a document that satisfy one or more marking criteria, the marks comprising start marks and end marks, the start marks specifying first locations in the document where nodes start, and the end marks specifying second locations in the document at or after where nodes end;
determining that one or more modifications have been made to a set of nodes in the document;
based at least in part on the one or more modifications, storing a logical value relative to at least one of the marks stored in the summary at a physical end of the LOB.

15. The one or more non-transitory computer-readable storage medium of claim 13, wherein the one or more marking criteria is a size of a node.

16. The one or more non-transitory computer-readable storage medium of claim 13, wherein the one or more marking criteria is a number of subnodes of a node.

17. The one or more non-transitory computer-readable storage medium of claim 13, wherein the one or more marking criteria is a name of a node and sub-nodes.

18. The one or more non-transitory computer-readable storage medium of claim 13, wherein the one or more marking criteria is a value of a node and sub-nodes.

19. The one or more non-transitory computer-readable storage medium of claim 13, wherein the document comprising nodes of hierarchical markup data is a plurality of documents comprising nodes of hierarchical markup data.

20. The one or more non-transitory computer-readable storage medium of claim 14, wherein the one or more modifications include adding data to the set of nodes in the document, and wherein the logical value indicates a positive value relative to the at least one of the marks.

21. The one or more non-transitory computer-readable storage medium of claim 14, wherein the one or more modifications include deleting data from the set of nodes in the document, and wherein the logical value indicates a negative value relative to the at least one of the marks.

22. The one or more non-transitory computer-readable storage medium of claim 14, the one or more sequences of instructions including instructions for:
determining that one or more nodes of the set of nodes satisfies one or more marking criteria;
determining that the summary does not include marks for the one or more nodes of the set of nodes;
adding marks to a new position in the summary for the one or more nodes; and
storing a logical position that indicates a position relative to the new position of the added marks.

23. The one or more non-transitory computer-readable storage medium of claim 14, the one or more sequences of instructions including instructions for:
determining that one or more nodes of the set of nodes does not satisfy one or more marking criteria;
determining that the summary includes marks for the one or more nodes of the set of nodes;
deleting marks from the summary for the one or more nodes.

24. The one or more non-transitory computer-readable storage medium of claim 14, wherein the document is one or more documents that conform to a hierarchical markup language.

* * * * *

UNITED STATES PATENT AND TRADEMARK OFFICE
CERTIFICATE OF CORRECTION

PATENT NO. : 10,037,311 B2
APPLICATION NO. : 14/231491
DATED : July 31, 2018
INVENTOR(S) : Idicula et al.

It is certified that error appears in the above-identified patent and that said Letters Patent is hereby corrected as shown below:

In the Specification

In Column 1, Line 35, delete "'/a/b/c'" and insert -- 'a/b/c' --, therefor.

Signed and Sealed this
Fourteenth Day of May, 2019

Andrei Iancu
*Director of the United States Patent and Trademark Office*